United States Patent [19]
Tucker

[11] 3,956,216
[45] May 11, 1976

[54] LATEX COMPOSITIONS CONTAINING POLYMERS HAVING REACTIVE AZOLIDE CURE SITES

[75] Inventor: Harold A. Tucker, Shaker Heights, Ohio

[73] Assignee: The B. F. Goodrich Company, Akron, Ohio

[22] Filed: July 23, 1975

[21] Appl. No.: 598,357

Related U.S. Application Data

[62] Division of Ser. No. 460,825, April 15, 1974, Pat. No. 3,912,682.

[52] U.S. Cl............................ 260/29.7 H; 428/270; 260/29.6 HN; 260/29.6 N; 260/29.6 TA; 260/29.7 N; 260/29.7 T; 260/79.7; 526/14; 526/50; 526/259; 526/280; 526/304; 526/263; 526/329; 526/330; 526/338; 526/342

[51] Int. Cl.$^2$.................. C08L 39/04; C08L 33/08; C08L 33/14; C08L 33/22

[58] Field of Search............. 260/29.6 HN, 29.6 TA, 260/29.6 N, 29.7 N, 29.7 H, 29.7 T, 79.7, 80.7, 80.72, 85.5, 86.1, 80.73, 80.75, 80.81, 87.7; 117/140

[56] References Cited
UNITED STATES PATENTS

| | | | |
|---|---|---|---|
| 2,850,485 | 9/1958 | D'Alelio | 260/80.5 |
| 3,013,001 | 12/1961 | Lynn | 260/87.7 |
| 3,527,719 | 9/1970 | Hurwitz et al. | 260/29.6 HN X |

OTHER PUBLICATIONS

Chem. Abs. 68:59892z.

*Primary Examiner*—Murray Tillman
*Assistant Examiner*—T. DeBenedictis, Sr.
*Attorney, Agent, or Firm*—Alan A. Csontos

[57] ABSTRACT

Ethylenically unsaturated azolide compounds are interpolymerized with acrylic ester monomers via an emulsion polymerization process. Di- or polyfunctional alcohols or amines are admixed with the resulting latexes to form latex compositions which are particularly useful as binders for nonwoven fibers. The latex compositions are stable at room temperatures, but upon drying and heating readily, yield crosslinked polymeric vulcanizates.

6 Claims, No Drawings

LATEX COMPOSITIONS CONTAINING POLYMERS HAVING REACTIVE AZOLIDE CURE SITES

This is a division of application Ser. No. 460,825 filed Apr. 15, 1974, now U.S. Pat. No. 3,912,682.

BACKGROUND OF THE INVENTION

Latexes containing reactive acrylic ester polymers are well known, and are widely used as binders for non-woven fibers. A disadvantage of some of the commercial latexes is their need for highly acidic (pH of about 2) cure conditions to exhibit fast, strong cures at low temperatures. The highly acidic condition is undesirable as it can degrade fibers, especially cellulose types, it can interfere with the use of latex thickening agents, and it can cause corrosion. New cure systems, which do not need highly acidic cure conditions, are actively sought.

The polymerization of unsaturated azolides is known (see U.S. Pat. Nos. 3,013,001 and 2,850,485). A general publication on azolides is "Synthesis Using Heterocyclic Amides (Azolides)" by H. A. Staab, in *Angew, Chem. Internat. Edit.*, Vol. 1, No. 7 (1962), Page 351.

SUMMARY OF THE INVENTION

Latex compositions comprising (A) 100 parts by weight of a latex containing a polymer comprising interpolymerized units of (1) from about 50 percent to about 99.5 percent by weight of an acrylic ester of the formula

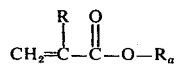

wherein R is H, a methyl, or an ethyl radical and $R_a$ is an alkyl radical containing 1 to about 24 carbon atoms, or an alkoxyalkyl, alkylthioalkyl or cyanoalkyl radical containing 2 to about 12 carbon atoms total in the radical, (2) from about 0.5 percent to about 50 percent by weight of an ethylenically unsaturated azolide of the formula

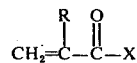

wherein R is defined as above and X is an azole radical where the carbonyl structure is directly attached to a nitrogen atom of the azole, and (3) up to 20 percent by weight of a copolymerizable vinylidene monomer, and (B) from about 0.5 part to about 10 parts by weight based upon 100 parts by weight of polymer in the latex of a di- or polyfunctional alcohol or diamine, are prepared. The latex compositions can be used to coat or impregnate nonwoven fibers, which, when heated to cure under acidic, neutral, or basic conditions, exhibit desirable dry and wet tensile strength.

DETAILED DESCRIPTION OF THE INVENTION

The latex compositions disclosed herein are comprised of (A) a latex containing a polymer having reactive azolide cure sites, and (B) a di- or polyfunctional alcohol or amine. The latex is the major constituent, being used at 100 parts by weight in the composition. The latex itself is comprised of essentially water, polymer, and various emulsifiers and/or dispersants well known to the art. The latex can contain other ingredients such as thickening agents, antioxidants and stabilizers, fungicides, fillers, plasticizers, and the like. The total solids of the latex ranges from about 1 percent to about 60 percent by weight based on the total weight of the latex. The exact range of total solids is not critical and higher or lower total solids can be used. However, for practical purposes, total solids of a latex will rarely exceed 60 percent by weight. A more preferred total solids content is from about 10 percent to 50 percent by weight. A total solids content of about 20 percent by weight is often used in coating or impregnating nonwoven fibers.

The latex contains, as the principle solid ingredient, a polymer having reactive azolide cure sites. The polymer consists essentially of interpolymerized units of (1) an acrylic ester monomer, (2) an ethylenically unsaturated azolide, and optionally (3) a copolymerizable vinylidene monomer.

The acrylic ester monomer is present in the polymer as interpolymerized units in the level of from about 50 percent to about 99.5 percent by weight based on the weight of the polymer. The acrylic ester monomer employed has the formula

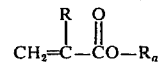

wherein R is hydrogen, or a methyl or ethyl radical, and $R_a$ is an alkyl radical containing 1 to about 24 carbon atoms, or an alkoxyalkyl, alkylthioalkyl or cyanoalkyl radical containing a total of 2 to about 12 carbon atoms. The alkyl structure can be linear or branched. Examples of the acrylic esters are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; methoxymethyl acrylate, methyl acrylate, methoxyethyl acrylate, ethoxyethyl acrylate, butoxyethyl acrylate, ethoxypropyl acrylate, methoxyethyl methacrylate, methylthioethylacrylate, hexylthioethyl acrylate, and the like; and 2-cyanoethyl acrylate, 3-cyanopropyl acrylate, 4-cyanobutyl acrylate, 6-cyanohexyl acrylate, 8-cyanooctyl acrylate, 2-cyanoethyl methacrylate, and the like. Often mixtures of two or more monomers and/or types of acrylic ester monomers are employed.

More preferredly, the polymer contains from about 70 percent to about 99 percent by weight of an acrylic ester monomer(s) wherein $R_a$ is an alkyl radical containing 1 to about 18 carbon atoms or an alkoxyalkyl radical containing 2 to about 8 carbon atoms total. Examples of the more preferred monomers are methyl acrylate, ethyl acrylate, n-propyl acrylate, isopropyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, octyl acrylate, 2-ethylhexyl acrylate and/or methoxyethyl acrylate.

The ethylenically unsaturated azolide monomer is present in the polymer as interpolymerized units in levels of from about 0.5 percent to about 50 percent, and more preferredly, from about 1 percent to about 10 percent by weight based on the total weight of the polymer. The azolide monomer has the formula

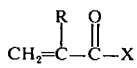

wherein R is defined as above, and X is an azole radical comprised of a 5-membered unsaturated heterocyclic ring having at least two nitrogen atoms and two conjugated double bonds, contained therein, wherein the carbonyl structure is directly attached to a nitrogen atom. By azole, therefore, is meant 5-membered ring structures including imidazoles, pyrazoles, and 1 to 4 carbon atom alkyl, phenyl, and nitro substituents thereof; and azoles wherein two carbon atoms of the ring are in common with a phenyl ring such as in benzimidazoles, benzotriazoles, and 1 to 4 carbon atom alkyl, halogen, and nitro substituents thereof. Examples of the azoles, from which the azole radicals are derived by removing a hydrogen atom from a nitrogen atom, are imidazole, 2-methylimidazole, 2-methyl-5-nitroimidazole, 4,5-diphenylimidazole, 4,5-diphenyl-2-methylimidazole; pyrazole, 3-methylpyrazole, 3,5-dimethylpyrazole; benzimidazole, 2-methyl-benzimidazole; and benzotriazole, 5-methylbenzotriazole, 5-chlorobenzotriazole, and 5-nitrobenzotriazole.

The structure

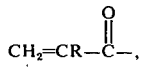

when R is hydrogen, is an acrylyl group; when R is methyl, is a methacrylyl group, and finally, when R is ethyl, is an ethacrylyl group. The ethylenically unsaturated azolide monomers can, therefore, be named as the N-substituted (eth or meth) acrylyl (pyr-, imid-, etc.) azole. Examples of the compounds are N-acrylylpyrazole, N-acrylyl-3,5-dimethylpyrazole, N-acrylylimidazole, N-methacrylylimidazole, N-methacrylylbenzimidazole, N-acrylylbenzotriazole, and the like.

The ethylenically unsaturated azole monomers are prepared by reaction of an unsaturated acid chloride or anhydride with an azole. The preparation and reaction conditions are disclosed in U.S. Pat. No. 3,013,001, which is hereby incorporated by reference.

The polymer can also contain up to 20 percent by weight based on the weight of the polymer of interpolymerized units of a copolymerizable vinylidene monomer. The monomer is selected from the group consisting of styrene, α-methyl styrene, acrylonitrile, acrylamide, vinyl acetate, vinyl chloride, vinylidene chloride, butadiene, and isoprene.

The copolymerizable vinylidene monomer can also be selected from the group consisting of hydroxyl, amine and carboxyl-containing monomers. Examples of such monomers are 2-hydroxyethyl acrylate, 2-hydroxyethyl methacrylate, 3-hydroxypropyl acrylate, 5-hydroxy-3-methylpentyl acrylate, o-, m-, or p-vinyl benzyl alcohol, and the like; 2-amino-ethyl acrylate, and the hydrochloric acid salt of 2-amino-ethyl acrylate, and the like; and acrylic acid, methacrylic acid, 2-hexanoic acid, fumaric acid, and the like. Particularly preferred are the hydroxyl-containing monomers.

When these copolymerizable monomers are employed, the polymer composition preferably consists essentially of interpolymerized units of (1) from about 70 percent to about 99 percent by weight of the acrylic ester monomer(s) as defined, (2) from about 0.5 percent to about 10 percent by weight of the unsaturated azolide monomer as defined, and (3) from about 0.5 percent to about 20 percent by weight of the hydroxyl, amine, or carboxyl-containing monomer, all based upon the total weight of the polymer. With a composition as defined herein, it is not necessary to use a di- or polyfunctional alcohol or amine as a crosslinking agent for the polymer already contains its own reactive sites for intra- and intermolecular crosslinking. The polymer, in latex form, is simply used to coat or saturate the nonwoven fiber, and the article dried and heated to effect crosslinking of the polymer.

The ethylenically unsaturated azolides, acrylic ester monomer(s), and the copolymerizable monomer (if used) can be interpolymerized using emulsion (latex) techniques known to those skilled in the art. The polymerization can be performed as a batch reaction, or one or more ingredients can be proportioned during the run. Temperature of polymerization ranges from about −10° to about 100°C., whereas a more preferred range is from about 5° to about 80°C.

The polymerization is initiated by free-radical generating agents. Examples of such agents are organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Typical emulsion polymerization ingredients would inclue a persulfate salt or organic peroxide and usually a redox system, water adjusted to a desired pH with acids or bases and usually buffered with inorganic salts, and either anionic, cationic, or nonionic surface active agents well known to the art.

The polymerization normally is continued until about 90% or more conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol. The polymer is then usually washed with water and dried.

The second essential ingredient in the latex composition is a di- or polyfunctional alcohol or amine. The ingredient serves as a crosslinking agent for the polymer in the latex. It is used in amounts from about 0.5 part to about 10 parts by weight based upon 100 parts by weight of the polymer in the latex. More preferredly, the crosslinking agent is used on about a mole to mole basis of unsaturated azolide to hydroxyl and/or amine group content in the crosslinking agent.

The di- or polyfunctional alcohols or amines include aliphatic and aromatic diols, polyols, diamines, polyamines, and alcoholic amines (having both hydroxy and amino groups), and polymeric materials as polyether polyols, polyester polyols, polyether amides, polyester amides, and the like.

Examples of the crosslinking agents are alkylenediols such as 1,4-butanediol, 1,6-hexanediol, 4-methyl-1,4-pentanediol, 1,10-decanediol, and the like; alicyclic diols such as 1,4-cyclohexanediol, 2-hydroxymethylcyclohexanol, and the like; polyols such as 1,3,5-pentanetriol, glycerol, sorbital, and the like; alkylenediamines such as ethylenediamine, 1,2-butylenediamine, 2-methyl-1,4-diaminobutane, hexamethylenediamine, decamethylenediamine, dodecamethylenediamine, and the like; alicyclic diamines such as 1,4-diaminocyclohexane, 1,4-diaminoethylcyclohexane, and the like; aromatic diamines such as m-phenylenediamine, m-xylylenediamine, 3,3'-diaminobiphenyl, 4,4'-diaminodiphenylmethane, p,p'-bisaminomethyl diphenylmethane, and the like; heterocyclic diamines such as piperazine, aminoethylpiperazine, and the like; polyamines such as diethylenetriamine, triethylenetetraamine, and the like; and alkanolamines such as tris(hydroxyethyl)amine, bis(hydroxyethyl)methylamine, tris(hydroxypropyl)amine, 1-amino-2-hydroxypropane, 1-aminomethylcyclohexanol, m-aminophenyl 2-amino-6-hydroxypyridine, and the like. The more preferred crosslinking agents are the alkylenediols, the alkylenediamines, and the alkanolamines.

The crosslinking agent can be added directly to the latex; or it can be dissolved in a solvent such as chloroform, acetonitrile, or trichloroethylene, or suspended in water using an emulsifying agent, and then added to the latex. A third method of introducing the crosslinking agent is to saturate the nonwoven fiber with the latex, dry the article, and then saturate the dried article with the crosslinking agent or a solution thereof and again dry the article. The final cured article is the same no matter which way it is prepared.

As the novel interpolymers have particular utility as binders for nonwoven fibers, testing was directed to evaluation of the interpolymers in latex form as paper saturants. Actual testing included wet tensile strength, using an Instron tensile tester at a pull rate of 12 inches per minute. Wet tensile followed TAPPI procedure T465-m44 (specimens soaked in water for 16 hours before testing).

The coated or impregnated nonwoven fibers can be heated to effect cure under acidic, neutral, or basic pH conditions. Typically, neutral or slightly basic pH conditions are employed. Temperature of cure ranges from about 100° to about 150°C. or more. Time of cure varies inversely as to temperature, and ranges from about 1 minute to about 10 minutes or more. Cure conditions of 3 minutes at 150°C. at a neutral pH are particularly useful. Nonwoven fibers, such as paper, rag fibers, cotton, wool, regenerated cellulose, and the like, when coated or impregnated with the latex compositions of this invention and dried and cured by heating, exhibit improved dry and wet tensile strength, internal bond strength, and edge tear. The bound articles are useful as cloths for making sheeting, clothing apparel, and the like, and for preparing mats and treated paper.

The following examples serve to more fully illustrate the invention. Ingredients are given in parts by weight unless otherwise specified.

EXAMPLE I

N-acrylyl-3,5-dimethyl pyrazole was prepared by reacting 3,5-dimethylpyrazole with acrylyl chloride in the presence of triethylamine. 19.2 grams (0.2 mole) of 3,5-dimethylpyrazole and 20.2 grams (0.2 mole) of triethylamine were dissolved in 125 milliliters of benzene and the solution put into a dropping funnel. The acrylyl chloride, 18.1 grams (0.2 mole) was dissolved in 25 milliliters of benzene and this solution put into a flask equipped for stirring and cooled to 10°C. The pyrazole solution was then added to the acrylyl chloride solution over a period of 45 minutes with constant stirring. Temperature of the reaction mix was held at 8° to 15°C. throughout the addition. Following the addition, the reaction mix was allowed to warm to room temperature and let stand for 4 hours. The mix was then filtered to remove triethylamine-hydrochloric acid salt which was formed in the reaction. The filtrate was heated to evaporate off volatiles, leaving 24.5 grams of an amber-colored liquid residue. The residue was then cooled to about 0°C. and 12.1 grams of a white crystalline precipitate was filtered out. After standing 16 hours at about 0°C., 2.5 more grams of crystalline solid was filtered out. The solids were combined and twice recrystallized from a solution of 18 milliliters of methanol and 2 milliliters of water to yield 9.4 grams of a crystalline solid having a melting point of 36°–37°C. The nuclear magnetic resonance (NMR) spectra of the solid conformed with that of the expected product.

EXAMPLE II

The N-acrylyl-3,5-dimethylpyrazole prepared in Example I was copolymerized with ethyl acrylate using an emulsion polymerization technique. The ingredients were placed into a glass reactor vessel and agitated for the time indicated. The resulting latex was stable. Good conversion of monomer to polymer was obtained. The recipe used, polymerization conditions, and results are as follows:

| | |
|---|---|
| Ethyl acrylate, grams | 97 |
| N-acrylyl-3,5-dimethyl-pyrazole, grams | 3 |
| Water, milliliters | 175 |
| Sodium lauryl sulfonate, milliliters[a] | 30 |
| Naphthalene sulfonate, milliliters[b] | 9 |
| Sodium hydrosulfite, milliliters[c] | 8.3 |
| Sodium formaldehyde sulfoxalate, milliliters[b] | 10 |
| Sodium salt of ethylenediamine tetraacetic acid and sodium gluconate, milliliters[d] | 8.3 |
| p-Menthane hydroperoxide, milliliters[e] | 0.2 |
| Temperature, °C. | 5 |
| Time, hours | 0.75 |
| Percent total solids | 29 |
| Percent conversion | 97 |

[a]15% by weight in water
[b]10% by weight in water
[c]0.5% by weight in water
[d]0.24 and 0.13 grams in 100 milliliters of water
[e]50% by weight in water

EXAMPLE III

Latex compositions prepared from the latex prepared in Example II were evaluated as latex binders for nonwoven fibers. The fiber used in the test was saturation grade, bleached Kraft paper of 11 mils thickness. Strips of the paper 8 inches by 3.25 inches were soaked in each latex composition and then dried and cured by heating. Solids pickup by the paper was about 55 percent by weight for each strip. Crosslinking agents were added to the latex by either dissolving them in the latex or adding them to the latex as a solution or suspension, or by soaking the latex saturated, dried paper strips in a solution containing the crosslinking agent and drying the strips prior to curing the strips. The latter method can be used if the crosslinking agent cannot be conveniently or homogeneously dispersed in the latex by simple mixing. Whether the crosslinking agent is added directly to the latex, or added after the nonwoven is saturated or coated with the latex, the final composition is the same (i.e., a polymeric material as defined plus the di- or polyfunctional alcohol or amine).

Three latex compositions of this invention were prepared and evaluated as binders for the described paper. The latex itself, used without the defined crosslinking agents, was evaluated as a control. Each latex sample had a pH of about 7. The latex compositions and saturated nonwoven articles thereof were prepared as follows:

Latex Sample 1 (Control Sample). 20 grams of the latex prepared in Example II was diluted by the addition of 10 grams of water to give about a 20% by weight total solids latex. Strips of paper were soaked in the latex, dried at room temperature (polymer pickup was from 51 to 58% by weight), and cured.

Latex Sample 2. 30 grams of latex prepared as in Sample 1 was admixed with 0.065 grams of 1,6-hexanediol as a crosslinking agent. Strips of paper were soaked in the latex composition, dried at room temperature (polymer pickup was from 56 to 60% by weight), and cured. The diol was used at about 1.1 parts by weight per 100 parts by weight of the polymer in the latex.

Latex Sample 3. 30 grams of latex prepared as in Sample 1 was admixed with 0.069 grams of 1,6-hexanediamine as a crosslinking agent. Strips of paper were soaked in the latex composition, dried at room temperature (polymer pickup was from 57 to 60% by weight), and cured. The diamine was used at about 1.1 parts by weight based upon 100 parts by weight of the polymer in the latex.

Latex Sample 4. Strips of paper were soaked in 20 grams of the latex prepared in Example II and then dried at room temperature. 0.12 grams of 1,12-dodecanediamine was dissolved in 3 milliliters of acetonitrile, and the latex saturated, dried paper strips soaked in the solution and dried at room temperature. Total pickup of the strips was 54 to 58% by weight. The diamine was used at about 2.0 parts by weight per 100 parts by weight of the polymer in the latex.

EXAMPLE IV

The latex sample articles prepared in Example III were evaluated as to their wet tensile strength. Wet tensile strength is measured as dry tensile strengths do not satisfactorily evidence the degree of cure or crosslinking that took place. Furthermore, many latex bound articles must exhibit good wet tensile strength to endure washing and cleaning. The test used was Tappi procedure T465-m44, wherein the paper strips are soaked overnight in water and then pulled on an Instron Tensile tester at a jaw speed of 12 inches per minute. The latex sample articles prepared were cut into three strips of equal width so that test samples are run in triplicate and the arithmetic average reported. Results of the testing are reported in the following table.

| Sample | Wet Tensile Strength (psig) Cured 3 Minutes At: | | |
|---|---|---|---|
| | 100°C. | 125°C. | 150°C. |
| Latex 1 (control) | 3.1 | 3.8 | 4.0 |
| Latex 2 | 3.2 | 5.1 | 34.7 |
| Latex 3 | 9.4 | 9.3 | 8.8 |
| Latex 4 | 21.9 | 24.1 | 21.4 |

The data shows that the use of latex compositions of the present invention as binders for nonwoven fibers yield articles having improved wet tensile strength. The degree of improvement depends in part upon the time and temperature of cure, the solubility of the crosslinking agent in the latex, and the reactivity of the crosslinking agent (both in hydroxyl and amino group reactivity and in the type of alcohol or amine used). Cures at 150°C. are particularly good. Of particular importance is the fact that all the cures were performed at neutral pH conditions. No highly acidic pH environment is necessary to obtain good strong cures.

I claim:

1. A latex composition comprising (A) 100 parts by weight of a latex containing a polymer consisting essentially of interpolymerized units of (1) from about 50 percent to about 99.5 percent by weight of an acrylic ester monomer of the formula

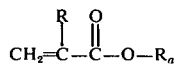

wherein R is hydrogen, or a methyl or ethyl radical and $R_a$ is selected from the group consisting of alkyl radicals containing 1 to about 24 carbon atoms and alkoxyalkyl radicals, containing 2 to about 12 carbon atoms total in the radical, (2) from about 0.5 percent to about 50 percent by weight of an ethylenically unsaturated azolide of the formula

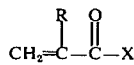

wherein R is defined as above and X is an azole radical comprised of a 5-membered unsaturated heterocyclic ring having at least two nitrogen atoms and two conjugated double bonds contained therein, where the carbonyl structure is directly attached to a nitrogen atom of the azole, and (3) up to 20 percent by weight of a copolymerizable vinylidene monomer, and (B) from about 0.5 part to about 10 parts by weight based upon 100 parts by weight of polymer in the latex of a di- or polyfunctional alcohol.

2. A latex composition of claim 1 where in (B), the alcohol is an alkylenediol.

3. A latex composition of claim 2 where in (A), the polymer consists essentially of interpolymerized units of (1) from about 70 percent to about 99 percent by weight of said acrylic ester monomer wherein $R_a$ is an alkyl radical containing 1 to about 18 carbon atoms or an alkoxyalkyl radical containing 2 to about 8 carbon atoms total, (2) from about 1 percent to about 10 percent by weight of said ethylenically unsaturated azolide, and (3) up to about 20 percent by weight of a copolymerizable vinylidene monomer selected from the group consisting of styrene, α-methyl styrene, acrylonitrile, acrylamide, vinyl acetate, vinyl chloride, vinylidene chloride, butadiene, and isoprene.

4. A latex composition of claim 3 where in (A), the azole radical is selected from the group consisting of imidazoles, pyrazoles, benzimidazoles and benzotriazoles.

5. A latex composition of claim 3 where in (A), the ethylenically unsaturated azolide is N-acrylyl-3,5-dimethylpyrazole.

6. A latex composition of claim 5 where in (A) the acrylic ester monomer is ethyl acrylate and in (B) the alkylenediol is 1,6-hexanediol.

* * * * *